US006271279B1

(12) United States Patent
Nodelman et al.

(10) Patent No.: US 6,271,279 B1
(45) Date of Patent: Aug. 7, 2001

(54) HIGH RESILIENT FLEXIBLE URETHANE FOAM AND FLEXIBLE MOLDED FOAMS BASED ON ALLOPHANATE MODIFIED ISOCYANATES

(75) Inventors: Neil H. Nodelman, Upper St. Clair; Karl W. Haider, McKees Rocks, both of PA (US); William E. Slack, Moundsville, WV (US)

(73) Assignee: Bayer Corporation, Pittsburgh, PA (US)

( * ) Notice: Subject to any disclaimer, the term of this patent is extended or adjusted under 35 U.S.C. 154(b) by 0 days.

(21) Appl. No.: 09/613,366

(22) Filed: Jul. 10, 2000

(51) Int. Cl.$^7$ .................................................. C08G 18/10
(52) U.S. Cl. ......................... 521/159; 521/155; 521/170; 521/172; 521/174
(58) Field of Search ................................... 521/159, 170, 521/172, 174, 155

(56) References Cited

U.S. PATENT DOCUMENTS

| | | | |
|---|---|---|---|
| 4,239,856 | 12/1980 | Rowton | 521/118 |
| 4,256,849 | 3/1981 | Ick et al. | 521/129 |
| 4,261,852 | 4/1981 | Carroll et al. | 528/59 |
| 4,365,025 | 12/1982 | Murch et al. | 521/159 |
| 4,478,960 | 10/1984 | Buethe et al. | 521/160 |
| 4,554,295 | 11/1985 | Ridge, Jr. | 521/110 |
| 4,738,991 | 4/1988 | Narayan | 521/124 |
| 4,833,176 | 5/1989 | Wolf et al. | 521/160 |
| 4,866,103 | 9/1989 | Cassidy et al. | 521/159 |
| 4,876,292 | 10/1989 | Milliren | 521/159 |
| 4,945,117 | 7/1990 | Gansen et al. | 521/99 |
| 5,070,114 | 12/1991 | Watts et al. | 521/159 |
| 5,319,053 | 6/1994 | Slack et al. | 528/48 |
| 5,319,054 | 6/1994 | Slack et al. | 528/48 |
| 5,369,138 | 11/1994 | Gansen | 521/159 |
| 5,521,225 | 5/1996 | Gerber et al. | 521/155 |
| 5,521,226 | 5/1996 | Bleys | 521/174 |
| 5,874,485 | 2/1999 | Milliren et al. | 521/160 |

FOREIGN PATENT DOCUMENTS

| | | |
|---|---|---|
| 2014508 | 10/1990 | (CA) . |
| 0 031 650 | 7/1981 | (EP) . |
| 0 022 617 | 9/1991 | (EP) . |
| 994890 | 6/1965 | (GB) . |
| 1520846 | 8/1978 | (GB) . |

Primary Examiner—John M. Cooney, Jr.
(74) Attorney, Agent, or Firm—Joseph C. Gil; N. Denise Brown

(57) ABSTRACT

This invention relates to a process for the preparation of a flexible foam. This process comprising reacting a liquid, storage stable, allophanate-modified polyisocyanate having an NCO group content of about 20 to about 42%, with an isocyanate-reactive component, in the presence of a blowing agent and at least one catalyst, wherein the relative amounts of the polyisocyanate and the isocyanate-reactive component are such that the NCO index if from about 70 to about 130.

28 Claims, No Drawings

HIGH RESILIENT FLEXIBLE URETHANE FOAM AND FLEXIBLE MOLDED FOAMS BASED ON ALLOPHANATE MODIFIED ISOCYANATES

BACKGROUND OF THE INVENTION

This invention relates to a process for the preparation of a flexible foam and of a molded flexible foam. This process comprises reacting a liquid, storage stable, allophanate modified polyisocyanate having an NCO group content of from about 20 to about 42%, with an isocyanate-reactive component, in the presence of a blowing agent, and at least one catalyst, wherein the quantities of polyisocyanate and isocyanate-reactive component are such that the NCO index of the system is from about 70 to about 130. The present invention also relates to the flexible foams and molded flexible foams prepared by these processes.

Flexible polyurethane foams and processes for their preparation are known and are described in, for example, U.S. Pat. Nos. 4,478,960, 4,833,176, 4,876,292, 4,945,117, 5,070,114, 5,369,138, 5,521,225 and 5,521,226, and in European Patents 0010850 and 0022617. Mixtures of diphenylmethane diisocyanate (MDI), polyphenylene polymethylene polyisocyanates, prepolymers based on such materials, and toluene diisocyanate are known to be suitable for preparing flexible foams. See, for example, U.S. Pat. Nos. 4,239,856, 4,256,849, 4,261,852 and 4,365,025.

U.S. Pat. No. 5,070,114 discloses the preparation of flexible foams prepared from diphenylmethane diisocyanate (MDI) based prepolymers having a rather low NCO value and from an isocyanate-reactive composition comprising relatively high amounts of water.

U.S. Pat. No. 4,478,960 describes the preparation of flexible polyurethane from 1) a prepolymer based on MDI and optionally polymeric MDI, and a polyol having from 5 to 30% by wt. of oxyethylene groups, wherein the prepolymer has an NCO group content of 12 to 30% by wt., 2) polymeric MDI, if 1) above is MDI, 3) a polyol having a low EO content and 4) a blowing agent.

A process for the preparation of a flexible foam from a prepolymer having an NCO content of from 15 to 30% by wt. is disclosed by U.S. Pat. No. 4,945,117. These flexible foams are prepared from a polyol having a functionality of at least 4.

The preparation of flexible foams from polyisocyanate prepolymers is disclosed by U.S. Pat. No. 5,369,138. The prepolymer is reacted with water and a mixture of a polyol having a low oxyethylene content and a polyol having a high oxyethylene content.

U.S. Pat. No. 4,876,292 describes a particular isocyanate-reactive mixture suitable for preparing flexible polyurethane foams. This mixture comprises up to 3 parts by wt. of an amine corresponding to a specific formula, up to 30% by wt. of a polyoxyalkylene polyamine having a molecular weight of from about 400 to about 5000 and containing from 2 to 3 primary amino groups, and from 70 to 100% by wt. of one or more polyether polyhydroxyl compounds having hydroxyl functionalities of from 2 to 3 and molecular weights of from 1000 to 10,000. Polymethylene poly(phenyl isocyanates) or prepolymers thereof are suitable for reaction with these isocyanate-reactive mixtures.

The process for producing flexible foams disclosed by U.S. Pat. No. 5,521,225 comprises reacting a polyisocyanate composition having an NCO group content of 10 to 25% by wt., with a specific polyol composition. Suitable polyisocyanate compositions comprise a) an isocyanate prepolymer having an NCO content of 5 to 15% by wt. and being prepared by reacting an excess of polyisocyanate and a polyol of specified functionality, equivalent weight and EO content, and b) a polyisocyanate having an NCO content of 30 to 33% by wt.

Allophanate modified isocyanates are also known in the art. Various isocyanates containing allophanate groups and processes for their production are disclosed in, for example, U.S. Pat. No. 4,738,991, 4,866,103, 5,319,053 and 5,319,054, European Patents 0,031,650 and 0,393,903, and GB Patent 994,890. European Patent 0,393,903 is of relevance; it discloses some examples wherein flexible foams are prepared. These flexible foams, however, are produced from an allophanate-modified isocyanate based on MDI containing 20% by weight of the 2,4'-isomer of MDI, and high molecular weight polyether polyols having a functionality of 2 to 3.

U.S. Pat. No. 4,738,991 is also of interest in that it discloses one example wherein a flexible foam is prepared. This flexible foam, however, is produced from an allophanate-modified isocyanate prepared from toluene diisocyanate and ethylene glycol. It has since been found that at the high levels of TDI allophanate modification which are necessary to minimize the polymer polyol content in the foam formulation, a TDI allophanate prepared from ethylene glycol gives only poor humid aged compression set.

European Patent 0,031,650 describes MDI based allophanate modified isocyanates. These blends, however, consist of an allophanate modified MDI which is the reaction product of an alcohol with an MDI based isocyanate comprising more than 20% by weight of the 2,4'-isomer of MDI. It also discloses that these may be suitable isocyanates for flexible foam molding.

U.S. Pat. No. 5,874,485 disclosed flexible foams and flexible molded foams based on allophanate-modified diphenylmethane diisocyanates, and processes for the production of these foams. The allophanate-modified diphenylmethane diisocyanates are characterized by an NCO group content of from 12 to 32.5%, and are prepared by reacting an aliphatic or aromatic alcohol with diphenylmethane diisocyanate of the specified isomer distribution. These allophanate-modified diphenyl-methane diisocyanates essentially correspond to those described in U.S. Pat. No. 5,319,053. Flexible foams and flexible molded foams can be prepared by reacting these allophanate-modified diphenylmethane diisocyanates with an isocyanate-reactive component in the presence of a blowing agent and at least one catalyst. To lower compression sets of the flexible foams, it was necessary to blend the allophanate-modified MDI with PMDI. Compression sets low enough for the foams to be useful in automotive seating, etc. could be obtained by the addition of an amine based alcohol crosslinker such as diethanolamine.

GB 1,520,846 discloses flexible foams and a process for the production of flexible foams from a liquid polyisocyanate prepared by reacting an excess of TDI in the absence of an allophanate catalyst, with an oxypropylated triol having a molecular weight of 200 to 800.

Flexible foams are also disclosed by U.S. Pat. No. 4,554,295. These flexible foams comprise the reaction product of unmodified toluene diisocyanate with an isocyanate-reactive component comprising 100% by weight of a polymer polyol. These flexible foams require a minimum quantity of polymer polyol to be used as the isocyanate-reactive component in order to attain a certain hardness in the foams.

It has presently been found that allophanate modified isocyanates based on 1,2-propylene glycol or 1,3-butanediol can build hardness (ILD) in flexible foams and flexible molded foams using minor amounts or even no polymer polyol. Physical properties are suprisingly reasonable. Modified toluene diisocyanates usually result in poor humid aged compressions sets but the 1,2-propylene glycol and 1,3-butanediol allophanate modifications give acceptable values. Hardness of the resultant foams can be varied by simply varying the isocyanate index of the reaction system.

Flexible foams of varying hardness, reasonable physical properties and good humid aged compression sets can be formulated without polymer polyols by using allophanate modified polyisocyanates based on 1,2-propylene glycol or 1,3-butanediol. The advantage of this is a lower cost system due to the elimination of polymer polyols which are more expensive than conventional isocyanate-reactive components. In addition, prior art systems require the presence of a third stream for the polymer polyol component in order to easily adjust the hardness of the resultant flexible foam. The hardness of the foams can be adjusted by varying the isocyanate index.

Another advantage offered by the present invention is better demold characteristics of the flexible foams and flexible molded foams in comparison to convention flexible foams and flexible molded foams based on toluene-diisocyanate (TD-80). This is determined by compressing the four (4) corners of a freshly demolded block and measuring the permanent set.

SUMMARY OF THE INVENTION

This invention relates to a process for the preparation of flexible foams and flexible molded foams. These processes comprise (A) reacting (1) a liquid, storage stable, allophanate-modified polyisocyanate having an NCO group content of from about 20 to about 42%, preferably from about 23 to about 38%, with (2) an isocyanate-reactive component comprising at least one compound which contains isocyanate-reactive groups; in the presence of (3) at least one blowing agent, preferably water, and (4) at least one catalyst, preferably one or more tertiary amine catalyst, wherein (1) and (2) are present in amounts such that the isocyanate index is from about 70 to about 130, preferably from about 80 to about 115.

The present invention also relates to the flexible foams and to the flexible molded foams produced by these processes.

In accordance with the present invention, suitable (1) allophanate-modified polyisocyanates include those that are liquids, and storage-stable These comprise the reaction product of (a) a polyisocyanate, preferably a diisocyanate, more preferably an aromatic diisocyanate, and most preferably toluene diisocyanate; and (b) a compound selected from the group consisting of 1,2-propylene glycol and 1,3-butanediol.

Suitable isocyanate-reactive components for the present invention include those which contain isocyanate-reactive groups, preferably those having a molecular weight (number average) of from about 1,000 to about 10,000, a functionality of from about 1.5 to about 6.0, and OH number of about 11 to about 350. More preferably suitable isocyanate-reactive components comprise polyether polyols having a molecular weight of from about 2,000 to about 6,000, a functionality of about 1.8 to about 4.0 and an OH number of about 15 to about 115.

DETAILED DESCRIPTION OF THE INVENTION

Suitable allophanate-modified polyisocyanates for the present invention include those which are liquids, and are storage stable. These typically have an NCO group content of from about 20 to about 42%, and preferably from about 23 to about 38%. Suitable allophanate modified polyisocyanates comprise the reaction product of (a) a polyisocyanate, preferably a diisocyanate, more preferably an aromatic diisocyanate, and most preferably toluene diisocyanate, and (b) a compound selected from the group consisting of 1,2-propylene glycol and 1,3-butanediol.

As used herein, the term liquid with respect to the allophanate-modified polyisocyanates means that the allophanate does not precipitate solids when stored at 25° C. for 3 months; and the term storage stable with respect to the allophanate-modified polyisocyanates means that the allophanate-modified isocyanate has up to 1% absolute change in the NCO content and up to 10% change in the viscosity when stored at 25° C. for 3 months.

Suitable polyisocyanates to be used as component (a) in the preparation of the liquid, storage-stable allophanate-modified polyisocyanates include diisocyanates, preferably aromatic diisocyanates of the type described, for example, by W. Siefken in Justus Liebigs Annalen der Chemie, 562, pages 72 to 136. Specific examples of these compounds are ethylene diisocyanate, 1,4-tetramethylene diisocyanate, 1,6-hexamethylene diisocyanate; 1,1 2-dodecane diisocyanate, cyclobutane-1,3-diisocyanate; cyclohexane-1,3- and -1,4-diisocyanate and mixtures of these isomers. Additional examples are 1-isocyanato-3,3,5-trimethyl-5-isocyanatomethyl cyclohexane (German Auslegeschrift No. 1,202,785, U.S. Pat. No. 3,401,190), 2,4- and 2,6-hexahydro-tolylene diisocyanate and mixtures of these isomers. Hexahydro-1,3- and/or -1,4-phenylene diisocyanate; perhydro-2,4'- and/or -4,4'-diphenylmethane diisocyanate; 1,3- and 1,4-phenylene diisocyanate; 2,4- and 2,6-tolylene diisocyanate and mixtures of these isomers are also suitable in the instant invention. Diphenylmethane-2,4'- and/or -4,4'-diisocyanate; naphthylene-1,5-diisocyanate; triphenyl methane-4,4'-4"-triisocyanate; polyphenyl polymethylene polyisocyanates of the type obtained by condensing aniline with formaldehyde, followed by phosgenation and described, for example, in British Patent Nos. 874,430 and 848,671 may also be used in the present invention; m- and p-isocyanato-phenylsulfonyl isocyanates according to U.S. Pat. No. 3,454,606; perchlorinated aryl polyisocyanates of the type described, for example, in German Auslegeschrift No.1,157, 601 (U.S. Pat. No. 3,277,138); polyisocyanates containing carbodiimide groups of the type described in German Patent No. 1,902,007 (U.S. Pat. No. 3,152,162); diisocyanates of the type described in U.S. Pat. No. 3,492,330; and polyisocyanates containing allophanate groups of the type described, for example, in British Patent No.993,890, in Belgian Patent No. 761,626 and in published Dutch Patent Application No. 7,102,524 are still further examples of suitable isocyanates. Additionally, polyisocyanates containing isocyanurate groups of the type described, for example, in U.S. Pat. No. 3,001,973; in German Offenlegungsschriften Nos. 1,929,034 and 2,004,408; polyisocyanates containing urethane groups of the type described, for example, in Belgian Patent No. 752,261 or in U.S. Pat. No. 3,394,164; polyisocyanates containing acylated urea groups according to German Patent No.1,230,778 and polyisocyanates containing biuret groups of the type described, for example, in German Patent No. 1,101,394 (U.S. Pat. Nos. 3,124,605 and 3,201,372) and in British Patent No. 889,050 are also suitable.

Polyisocyanates produced by telomerization reactions of the type described, for example, in U.S. Pat. No. 3,654,106; polyisocyanates containing ester groups of the type described for example, in British Patent Nos. 965,474 and 1,072,956, in U.S. Pat. No. 3,567,763 and in German Patent No. 1,231,688; reaction products of the above-mentioned isocyanates with acetals according to German Patent No. 1,072,385 and polyisocyanates containing polymeric fatty acid residues, according to U.S. Pat. No. 3,455,883 are still further examples of suitable isocyanates.

Aromatic polyisocyanates are preferred for the present invention. More preferred are diphenylmethane diisocyanates and toluene diisocyanates. Toluene diisocyanates are most preferred in accordance with the present invention. It is particularly preferred to use toluene diisocyanate containing 80% by weight of the 2,4-isomer and 20% by weight of the 2,6-isomer and having an isocyanate content of 30 to 38% by weight.

Suitable allophanate-modified polyisocyanates for the present invention are prepared by reacting a diisocyanate as described above with a compound selected from the group consisting of propylene glycol and 1,3-butanediol.

Also necessary for the process of the present invention is an isocyanate reactive component. Generally, isocyanate reactive compounds include, for example, organic compounds containing hydroxyl groups or amine groups. It is generally preferred to include hydroxyl group containing compounds. These materials may be typically divided into two groups, high molecular weight compounds having a molecular weight of 1,000 to 10,000 and low molecular weight compounds, i.e., chain extenders, having a molecular weight of 62 to 399. Examples of suitable high molecular weight compounds include the polyesters, polyethers, polythioethers, polyacetals and polycarbonates having a functionality of about 1.5 to 6.0, and OH number of above 11 to about 350, of the type known for the production of polyurethanes.

Particularly preferred as the isocyanate-reactive compounds are the high molecular weight polyethers suitable for use in accordance with the invention are known and may be obtained, for example, by polymerizing epoxides such as ethylene oxide, propylene oxide, butylene oxide, tetrahydrofuran, styrene oxide or epichlorohydrin in the presence of $BF_3$, KOH, double metal cyanide, or other suitable alkoxylation catalyst, or by chemically adding these epoxides, preferably ethylene oxide and propylene oxide, in admixture or successively to components containing reactive hydrogen atoms such as water, alcohols or amines. Examples of alcohols and amines include the low molecular weight chain extenders set forth hereinafter, 4,4'-dihydroxy diphenyl propane, sucrose, aniline, ammonia, ethanolamine, ethylene diamine, propylene glycol, ethylene glycol, glycerin, etc. Also suitable are polybutadienes containing OH groups. These preferably have a functionality of about 1.8 to about 4.0, a molecular weight of about 2,000 to about 6,000, and an OH number of about 15 to about 115.

In addition, polyether polyols which contain high molecular weight polyadducts or polycondensates in finely dispersed form or in solution may be used. These include polyethers modified by vinyl polymers, of the type formed, for example, by polymerizing styrene or acrylonitrile in the presence of polyether (U.S. Pat. Nos. 3,383,351); 3,304,273; 3,523,093; and 3,110,695; and German Patent 1,152,536). Such modified polyether polyols are obtained when polyaddition reactions (e.g., reactions between polyisocyanates and amino functional compounds) or polycondensation reactions (e.g., between formaldehyde and phenols and/or amines) are directly carried out in situ in the polyether polyols.

The amount of polymer polyol used in the foams of the present invention should be less than 50% by weight of the quantity of polymer polyol used in the conventional TD-80 flexible foams and flexible molded foams when produced at the same hardness level. It is preferred to keep polyer polyol levels to a minimum. In fact, it is preferred that polymer polyols are not present in the foam formulations of the present invention.

Suitable examples of high molecular weight polyesters include the reaction products of polyhydric, preferably dihydric alcohols (optionally in the presence of trihydric alcohols), with polyvalent, preferably divalent, carboxylic acids. Instead of using the free carboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic and/or heterocyclic and may be unsaturated or substituted, for example, by halogen atoms. The polycarboxylic acids and polyols used to prepare the polyesters are known and described for example in U.S. Pat. Nos. 4,098,731 and 3,726,952, herein incorporated by reference in their entirety. Suitable polythioethers, polyacetals, polycarbonates and other polyhydroxyl compounds are also disclosed in the above-identified U.S. patents. Finally, representatives of the many and varied compounds which may be used in accordance with the invention may be found for example in High Polymers, Volume XVI, "Polyurethanes, Chemistry and Technology", by Saunders-Frisch, Interscience Publishers, New York, London, Vol. 1, 1962, pages 32–42 and 44–54, and Volume II, 1964, pages 5–6 and 198–199; and in Kunststoff-Handbuch, Vol. VII, Vieweg-Hochtlen, Carl-Hanser-Verlag, Munich, 1966, pages 45–71.

In accordance with the present invention, the high molecular weight compounds can be optionally used in a mixture with low molecular weight chain extenders and/or crosslinking agents. Low molecular weight cross-linking agents are not generally necessary due to the stability of the 1,2-propylene glycol- and 1,3-butanediol- allophanate-modified polyisocyanates of the present invention. Examples of suitable hydroxyl /group-containing chain extenders include ethylene glycol, 1,2- and 1,3-propylene diol, 1,3- and 1,4- and 2,3-butane diol, 1,6-hexane diol, 1,10-decane diol, diethylene glycol, triethylene glycol, tetraethylene glycol, dipropylene glycol, tripropylene glycol, glycerol, trimethylol propane, triethanolamine, propylene oxide adducts of ethylene diamine, etc. In general, crosslinking agents are present in amounts of from about 0 to about 3% by weight, based on the total weight of the isocyanate-reactive component.

Other suitable chain extenders include aromatic and aliphatic polyamines, preferably diamines, having molecular weights of less than 400, including the sterically hindered aromatic polyamines, preferably diamines, having molecular weights of less than 400, especially the sterically hindered aromatic diamines which contain at least one linear or branched alkyl substituent in the ortho-position to the first amino group and at least one, preferably two linear or branched alkyl substituents containing from 1 to 4, preferably 1 to 3, carbon atoms in the ortho-position to a second amino group. These aromatic diamines include 1-methyl-3,5-diethyl-2,4-diamino benzene, 1-methyl-2,4-diamino benzene, 1,3,5-triethyl-2,4-diamino benzene, 3,5,3',5'-tetraethyl-4,4'-diamino diphenylmethane, 3,5,3',5'-tetraisopropyl-4,4'-diamino diphenylmethane, 3,5-diethyl-3',5'-diisopropyl-4,4'-diamino diphenylmethane, 3,5-diethyl-5,5'-diisopropyl-4,4'-diamino diphenyl-methane, 1-methyl-2,-6-diamino-3-isopropylbenzene, 2-methyl-1,5-pentanediamine (Dytek A) and mixtures of the above diamines. Also suitable are mixtures of 1-methyl-3,5-diethyl-2,4-diamino benzene and 1-methyl-3,5-diethyl-2,6-diamino benzene in a weight ratio between about 50:50 to 85:15, preferably about 65:35 to 80:20.

Compounds containing one or more active amine group and one or more hydroxyl group are also suitable as crosslinking agents and/or chain extenders in the present invention. Examples include, but are not limited to, compounds such as monoethanolamine, diethanolamine, etc.

The reaction between (1) the liquid, storage stable, allophanate-modified polyisocyanate and (2) the isocyanate-reactive component in accordance with the present invention occurs in the presence of (3) at least one blowing agent, and (4) at least one catalyst.

Suitable blowing agents to be used as component (3) in the present invention include, for example, halogenated hydrocarbons, water, low boiling solvents such as, for example, pentane, and other known blowing agents. Water is preferably used as the sole blowing agent in the present invention.

Catalysts suitable to be used as component (4) in accordance with the present invention include, for example, various organic metal compounds, including, for example, tin(II) salts of carboxylic acids, dialkyl tin salts of carboxylic acids, dialkyl tin mercaptides, dialkyl tin dithioesters and tertiary amines, such as, for example, dimethylcyclohexylamine (i.e. Polycat 8), pentamethyldiethylenetriamine (i.e. Polycat 5), bis[2-dimethylaminoethyl]ether (Niax A-1), dimethylethanolamine (DMEA), Dabco WT, triethylene diamine (Dabco 33LV), pentamethyldipropylene triamine (Polycat 77), etc. Of course, it is also possible to use any of the catalysts which are well known to those skilled in the art of polyurethane chemistry. It is preferred to use tertiary amines as the catalysts in the present invention.

It is also possible that various additives and/or auxiliary agents may be included in the formulation. Some examples of suitable additives include surface-active additives such as emulsifiers and foam stabilizers. Examples of these include N-stearyl-N',N'-bis-hydroxyethyl urea, oleyl polyoxyethylene amide, stearyl diethanol amide, isostearyl diethanolamide, polyoxyethylene glycol monoleate, a pentaerythritol/adipic acid-oleic acid ester, a hydroxy ethyl imidazole derivative of oleic acid, N-stearyl propylene diamine and the sodium salts of castor oil sulfonates or of fatty acids. Alkali metal or ammonium salts of sulfonic acid such as dodecyl benzene sulfonic acid or dinaphthyl methane sulfonic acid and also fatty acids may be used as surface-active additives.

Suitable foam stabilizers include polyether siloxanes. The structure of these compounds is generally such that a copolymer of ethylene oxide and propylene oxide is attached to a polydimethyl siloxane radical. Such foam stabilizers are described in U.S. Pat. No. 2,764,565. It is preferred to use weak surfactants in the present invention, in amounts of from about 0.3 to about 3% by weight, more preferably in amounts of from about 0.5 to about 2% by weight (based on the weight of the high molecular weight polyether polyol component). Preferred commercially available surfactants include the silicone surfactants B-4690, B-4113 and E-9924, which are available from Goldschmidt and/or Bayer AG.

In addition to the surface-active agents, other additives which may be used in the molding compositions of the present invention include known internal mold release agents, pigments, cell regulators, flame retarding agents, plasticizers, dyes, fillers and reinforcing agents such as glass in the form of fibers or flakes or carbon fibers.

The compositions according to the present invention may be molded using conventional processing techniques at isocyanate indexes ranging from about 70 to 130 (preferably from 80 to 115). By the term "Isocyanate Index" (also commonly referred to as "NCO index"), is defined herein as the equivalents of isocyanate, divided by the total equivalents of isocyanate-reactive hydrogen containing materials, multiplied by 100. When water is present as some or all of the blowing agent, the quantity of water present is considered in calculating the isocyanate index.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all parts and percentages are parts by weight and percentages by weight, respectively.

EXAMPLES

The following compounds were used in the examples:

Isocyanate A was prepared by placing 100.0 parts of toluene diisocyanate (80% by weight of the 2,4-isomer and 20% by weight of the 2,6-isomer), 5.2 parts of 1,2-propylene glycol and 100 ppm of zinc acetylacetonate in a reactor padded with dry nitrogen and equipped with a stirrer and a thermometer. The stirred mixture was then heated to 90° C. for 2 hours, followed by the addition of 200 ppm of benzoyl chloride, and then cooled to 25° C. A liquid, storage stable, allophanate-modified polyisocyanate resulted having an NCO content of 35.1% and a viscosity of 220 mpa.s at 25° C.

Isocyanates C and E were prepared by a similar procedure to that as Isocyanate A.

Isocyanate A: a liquid, storage stable, allophanate modified polyisocyanate having an NCO group content of about 35.1%, which comprised the reaction product of an isomeric mixture of toluene diisocyanate (80% by weight of the 2,4-isomer and 20% by weight of the 2,6-isomer) and 1,2-propylene glycol. This isocyanate had a viscosity of 220 mpa.s at 25° C.

Isocyanate B: a liquid, storage stable, allophanate modified polyisocyanate having an NCO group content of about 35.9%, which comprised a blend of 94 parts by weight of Isocyanate A with 6 parts by weight of toluene diisocyanate isomers (80% by weight of the 2,4-isomer and 20% by weight of the 2,6-isomer)

Isocyanate C: a liquid, storage stable, allophanate modified polyisocyanate having an NCO group content of about 35.3%, which comprised the reaction product of 100 parts by weight of an isomeric mixture of toluene diisocyanate (80% by weight of the 2,4-isomer and 20% by weight of the 2,6-isomer) and 4.35 parts by weight of ethylene glycol. This isocyanate had a viscosity of 388 mPa.s at 25° C.

Isocyanate D: an isomeric mixture comprising 80% by weight of 2,4-toluene diisocyanate and 20% by weight of 2,6-toluene diisocyanate, having an NCO group content of about 48.2%

Isocyanate E: a liquid, storage stable, allophanate-modified polyisocyanate having an NCO group content of about 35.1%, which comprised the reaction product of an isomeric mixture of toluene diisocyanate (80% by weight of the 2,4-isomer and 20% by weight of the 2,6-isomer) and 1,3-butanediol. This isocyanate had a viscosity of 235 mPa.s at 25° C.

Polyol A: a glycerine initiated propylene oxide/ethylene oxide (83:17 wt. ratio) polyether polyol having an OH number of 35, a functionality of about 3, and a molecular weight of about 4800

Polyol B: a glycerine initiated propylene oxide/ethylene oxide (87:13 wt. ratio) polyether polyol having an OH number of 35, a functionality of about 3, and a molecular weight of about 4800

Polyol C: a SAN polymer polyol containing about 37% by weight of solids (styrene/acrylonitrile) in a base polyether polyol, wherein the base polyether polyol has an OH number of about 35, a functionality of about 3 and an ethylene oxide tip. This polymer polyols is commercially available as Arcol E822 from Arco Chemicals.

Polyol D: a SAN polymer polyol containing about 43% by weight of solids (styrene/acrylonitrile) in a base polyether polyol, wherein the base polyether polyol has an OH number of about 35, a functionality of about 3 and an ethylene oxide tip. This polymer polyols is commercially available as Arcol E821 from Arco Chemicals.

Crosslinker A: Diethanolamine (DEOA)

Surfactant A: a polyether polydimethyl siloxane copolymer, commercially available from Air Products as DC-5043

Surfactant B: a polyether polydimethyl siloxane copolymer, commercially available from Goldschmidt as B4690

Surfactant C: a polyether polydimethyl siloxane copolymer, commercially available from Bayer AG as E 9924

Catalyst A: 70% by wt. of bis(dimethylaminoethyl)ether in 30% by wt. dipropylene glycol Catalyst B: 33% triethylene diamine in dipropylene glycol Blowing Agent A: water The foam blocks prepared in the examples were formed by the following procedure:

An aluminum mold which measured 15 3/16"×15 3/16"×4" was first treated with ChemTrend PRC 798 (an external mold release agent), and then pre-heated with water to 140° F. Using a HK-120 foam machine equipped with Rexroth pumps and a MQ-8 mixhead, the reaction mixture was open-poured into the pre-heated mold. The polyol blend was pre-heated to 95° F., and the isocyanate component was pre-heated to 85° F. All foams were prepared using a throughput of 137 g/sec.; a shot time for a 2.5 pcf foam was 4.6 secs; an isocyanate pressure of 1750 psi and a polyol pressure of 1550 psi.

The cure test for the foams as reported in the tables was conducted as follows:

Following a 3-minute demold, each foam block was manually crushed. Then, a 3.75" thick block of the crushed foam was placed in a jig. Four (4) metal rods, each measuring 1" in diameter and located such that the center of each rod is 1.4" from a corner, compressed the four corners of the foam to a thickness of 1" for 60 seconds. After 24 hours, the "set" was measured. These values are reported as "Cure Test—% CT" in the tables.

All properties of the resultant foams were tested in accordance with ASTM 3574, except for the Cure Test as described herein and the Honda Wet Set.

TABLE 1

Effect of Variation in Isocyanate Index on Hardness of Foam

| Example | Example 1 | Example 2 | Example 3 | Example 4 |
|---|---|---|---|---|
| Polyol A | 100 | 100 | 100 | 100 |
| Blowing Agent A | 3.4 | 3.4 | 3.4 | 3.4 |
| Surfactant B | 1.15 | 1.15 | 1.15 | 1.15 |
| Catalyst A | 0.2 | 0.2 | 0.2 | 0.2 |
| Catalyst B | 0.6 | 0.6 | 0.6 | 0.6 |
| Total PBW | 105.35 | 105.35 | 105.35 | 105.35 |
| Isocyanate B | 52.2 | 41.5 | 46.9 | 57.4 |
| Isocyanate Index | 100 | 80 | 90 | 110 |
| Density, pcf | 2.3 | 2.43 | 2.38 | 2.26 |
| ILD 25R, lbs/50 in$^2$ | 31.5 | 17.8 | 27.2 | 43.1 |
| ILD 50R, lbs/50 in$^2$ | 57.3 | 33.3 | 49.5 | 76.0 |
| Hysteresis | 19.1 | 14.2 | 16.6 | 20.2 |
| Airflow, cfm | 1.70 | 2.45 | 2.15 | 2.25 |
| Ball Rebound, % | 58.5 | 57.7 | 59.5 | 56.7 |
| Tear @ 2 in/min, n/m | 220.6 | 1506. | 203.1 | 197.9 |
| Tensile Strength, kPa | 133.1 | 100.7 | 121.3 | 146.9 |
| Elongation, % | 122.7 | 137.2 | 131.3 | 105.6 |
| "Dry" 50% Compression Set $^{(1)}$ | 24.5 | 24.7 | 21.9 | 17.9 |
| "Humid Aged" 50% Compression Set $^{(2)}$ | 22.26 | 18.2 | 22.3 | 19.3 |
| Honda Wet Set % CT | 33.8 | 34.1 | 31.2 | 32.7 |
| Cure Test % CT | 9.68 | — | — | — |

$^{(1)}$ ASTM 3574 Test D
$^{(2)}$ ASTM 3574, Autoclaved under Procedure J1, drying step 3 hrs. @ 100° C./in thickness As seen in Table 1 above, the ILD 50 values for the flexible foams pre-prepared in accordance with the present invention more than double when the isocyanate index is increased from 80 (Example 2) to 110 (Example 4).

TABLE 2

Effect of Polyisocyanate on Physical Properties of Foams

| Example | Example 5 | Example 6 | Example 7 | Example 8 Control |
|---|---|---|---|---|
| Polyol A | 100.0 | 100.0 | 100.0 | 60 |
| Polyol C | | | | 40 |
| Crosslinker A | | | | 0.95 |
| Blowing Agent A | 3.7 | 3.95 | 3.53 | 3.3 |
| Surfactant B | — | — | — | 1.15 |
| Surfactant B | 1.15 | 1.15 | 1.15 | — |
| Catalyst A | 0.2 | 0.2 | 0.2 | 0.1 |
| Catalyst B | 0.6 | 0.6 | 0.6 | 0.3 |
| Total PBW | 105.65 | 105.90 | 105.48 | 105.8 |
| Isocyanate A | 38.5 | — | — | — |
| Isocyanate C | — | 60.4 | 54.9 | — |
| Isocyanate D | — | — | — | 38.5 |
| Isocyanate Index | 100 | 100 | 100 | 100 |
| Density, pcf | 2.27 | 2.26 | 2.31 | 2.28 |
| ILD 25R, lbs/50 in$^2$ | 43.6 | 39.6 | 35.3 | 33.9 |
| ILD 50R, lbs/50 in$^2$ | 78.3 | 72.2 | 64.5 | 70.6 |
| Hysteresis | 21.9 | 22.1 | 20.9 | 15.1 |
| Airflow, cfm | 2.20 | 1.30 | 1.45 | 1.25 |
| Ball | 57.0 | 56.0 | 57.5 | 59.0 |

TABLE 2-continued

Effect of Polyisocyanate on Physical Properties of Foams

| Example | Example 5 | Example 6 | Example 7 | Example 8 Control |
|---|---|---|---|---|
| Rebound, % |  |  |  |  |
| Tear @ 2 in/min, n/m | 238.2 | 231.2 | 243.4 | 236.4 |
| Tensile Strength, kPa | 144.1 | 137.9 | 131.0 | 184 |
| Elongation, % | 105.2 | 110.5 | 109.7 | 104 |
| "Dry" 50% Compression Set [1] | 22.1 | 30.2 | 23.3 | 9.7 |
| "Humid Aged" 50% Compression Set [2] | 21.8 | 51.9 | 33.6 | 22.4 |
| Honda Wet Set, % CT | 31.6 | 41.7 | 40.1 | 24.1 |
| Cure Test, % CT | 35.48 | — | — | 44.5 |

[1] ASTM 3574 Test D
[2] ASTM 3574, Autoclaved under Procedure J1, drying step 3 hrs. @ 100° C./in. thickness The above examples demonstrate that the propylene glycol based allophanate modified polyisocyanate (Example 5) has better humid aged compression set than the ethylene glycol based allophanate modified polyisocyanate (Examples 6 and 7). In fact, the humid aged compression set of the propylene glycol based allophanate modified polyisocyanate is very similar to the control system based on an isomeric mixture of toluene diisocyanate (Example 8) which contains a polymer polyol as part of the isocyanate-reactive component.

TABLE 3

Physical Properties of PG Based Allophanate Modified Polyisocyanate Using a Different Polyol Blend

| Example | Example 9 | Example 10 |
|---|---|---|
| Polyol B | 100.0 | 100.0 |
| Blowing Agent A | 3.4 | 3.4 |
| Surfactant B | 1.15 | 1.15 |
| Catalyst A | 0.2 | 0.2 |
| Catalyst B | 0.2 | 0.2 |
| Total PBW: | 105.35 | 105.34 |
| Isocyanate A | 53.4 | 57.3 |
| Isocyanate Index | 100 | 107 |
| Density, pcf | 2.29 | 2.23 |
| ILD 25R, lbs/50 in$^2$ | 32.2 | 36.9 |
| ILD 50R, lbs/50 in$^2$ | 58.1 | 66.6 |
| Hysteresis | 16.9 | 19.9 |
| Airflow, cfm | 2.25 | 2.25 |
| Ball Rebound, % | 61.0 | 59.5 |
| Tear @ 2 in/min, n/m | 217.2 | 215.4 |
| Tensile Strength, kPa | 145.5 | 145.5 |
| Elongation, % | 128.8 | 113.8 |
| "Dry" 50% Compression Set | 17.4 | 20.1 |
| "Humid Aged" 50% Compression Set | 17.8 | 17.9 |
| Honda Wet Set % CT | 27.8 | 28.7 |
| Cure Test, % CT | 16.99 | 22.79 |

[1] ASTM 3574 Test D
[2] ASTM 3574, Autoclaved under Procedure J1, drying step 3 hrs. @ 100° C./in thickness Examples 9 and 10 demonstrate that the humid aged compression set of allophanate modified polyisocyanates based on propylene glycol can be further improved by selecting a polyether polyol with a lower EO content vs. the polyether polyol used in Example 5.

TABLE 4

Comparison of Different Allophanate Modified Isocyanates with Toluene Diisocyanate in Preparation of Flexible Foams

| Example | Example 11 | Example 12 | Example 13 |
|---|---|---|---|
| Polyol A | 40.0 | 100.0 | 100.0 |
| Polyol C | 60.0 |  |  |
| Blowing Agent A | 3.25 | 3.95 | 3.95 |
| Crosslinker A | 0.95 |  |  |
| Surfactant A | 1.15 |  |  |
| Surfactant B |  | 1.15 | 1.15 |
| Catalyst A | 0.1 | 0.2 | 0.2 |
| Catalyst B | 0.3 | 0.6 | 0.6 |
| Total PBW: | 105.75 | 105.9 | 105.9 |
| Isocyanate A |  | 64.6 |  |
| Isocyanate D | 38.5 |  |  |
| Isocyanate E |  |  | 64.6 |
| Isocyanate Index | 100 | 100 | 100 |
| Density, pcf | 2.29 | 2.22 | 2.21 |
| ILD 25R, lbs/50 in$^2$ | 34.1 | 42.2 | 40.4 |
| ILD 50R, lbs/50 in$^2$ | 72.1 | 100.0 | 95.6 |
| Hysteresis | 14.3 | 23.8 | 23.2 |
| Airflow, cfm | 1.30 | 0.63 | 1.20 |
| Ball Rebound, % | 65.9 | 55.7 | 55.9 |
| Tear @ 2 in/min, n/m | 212.5 | 206.5 | 205.5 |
| Tensile Strength, kPa | 180.5 | 173.0 | 181.0 |
| Elongation, % | 100.4 | 96.6 | 102.3 |
| "Dry" 50% Compression Set [1] | 13.6 | 19.3 | 20.6 |
| "Humid Aged" 50% Compression Set [2] | 18.1 | 23.7 | 24.8 |
| Honda Wet Set, % CT | 23.3 | 35.2 | 37.5 |

[1] ASTM 3574 Test D
[2] ASTM 3574, Autoclaved under procedure J1, Drying Step 2 Hrs. @ 100° C./in. thickness

TABLE 5

Comparison of Allophanate-Modified Polyisocyanate of the Invention in Flexible Foam Without Polymer Polyol vs. Toluene Diisocyanate in Flexible Foam With Polymer Polyol

| Example | Example 14 (Control) | Example 15 |
|---|---|---|
| Polyol A | 95 | 100 |
| Polyol D | 5 | — |
| Blowing Agent A | 2.0 | 2.15 |
| Crosslinker A | 1.06 | — |
| Surfactant A | 1.25 | — |
| Surfactant C | — | 1.25 |
| Catalyst A | 0.1 | 0.2 |
| Catalyst B | 0.3 | 0.45 |
| Total PBW: | 104.71 | 104.05 |
| Isocyanate A |  | 33 |
| Isocyanate D | 27.6 |  |
| Isocyanate Index | 100 | 90 |
| Density, pcf | 3.53 | 3.52 |
| ILD 25R, lbs/50 in$^2$ | 31.6 | 40.5 |
| ILD 50R, lbs/50 in$^2$ | 56 | 72 |
| Hysteresis | 8.1 | 11.6 |
| Airflow, cfm | 1.35 | 2.25 |
| Ball Rebound, % | 67 | 68 |
| Tear @ 2 in/min, n/m | 120 | 113 |
| Tensile Strength, kPa | 114 | 93 |
| Elongation, % | 166 | 120 |
| "Dry" 50% Compression Set [1] | 8.2 | 8.2 |
| "Humid Aged" 50% Compression Set [2] | 12.4 | 12.7 |

TABLE 5-continued

Comparison of Allophanate-Modified Polyisocyanate of the
Invention in Flexible Foam Without Polymer Polyol vs.
Toluene Diisocyanate in Flexible Foam With Polymer Polyol

| Example | Example 14 (Control) | Example 15 |
|---|---|---|
| Honda Wet Set, % CT | 8.1 | 8.4 |

(1) ASTM 3574 Test D
(2) ASTM 3574, Autoclaved under procedure J1, Drying Step 2 Hrs. @ 100° C./in. thickness

TABLE 6

Comparison of Allophanate-Modified Polyisocyanate of the
Invention in Flexible Foam Without Polymer Polyol vs. Toluene
Diisocyanate in Flexible Foam With Polymer Polyol

| Example | Example 16 (Control) | Example 17 |
|---|---|---|
| Polyol A | 59 | 100 |
| Polyol D | 41 | — |
| Blowing Agent A | 2.0 | 2.15 |
| Crosslinker A | 1.06 | — |
| Surfactant A | 1.25 | — |
| Surfactant C | — | 1.25 |
| Catalyst A | 0.1 | 0.2 |
| Catalyst B | 0.3 | 0.45 |
| Total PBW: | 104.71 | 104.05 |
| Isocyanate A | | 40.34 |
| Isocyanate D | 26.75 | |
| Isocyanate index | 100 | 110 |
| Density, pcf | 3.50 | 3.37 |
| ILD 25R, lbs/50 in$^2$ | 38 | 54.5 |
| ILD 50R, lbs/50 in$^2$ | 68 | 95 |
| Hysteresis | 8.5 | 11.6 |
| Airflow, cfm | 1.4 | 2.5 |
| Ball Rebound, % | 67 | 66 |
| Tear @ 2 in/min, n/m | 156 | 144 |
| Tensile Strength, kPa | 144 | 105 |
| Elongation, % | 156 | 117 |
| "Dry" 50% Compression Set (1) | 7.8 | 8.5 |
| "Humid Aged" 50% Compression Set (2) | 12.8 | 15.9 |
| Honda Wet Set, % CT | 6.9 | 10.6 |

(1) ASTM 3574 Test D
(2) ASTM 3574, Autoclaved under procedure J1, Drying Step 2 Hrs. @ 100° C./in. thickness

TABLE 7

Comparison of Allophanate-Modified Polyisocyanate of the
Invention in Flexible Foam Prepared With 30 PHR Polymer Polyol vs.
Toluene Diisocyanate in Flexible Foam Prepared
With 80 PHR Polymer Polyol

| Example | Example 18 (Control) | Example 19 |
|---|---|---|
| Polyol A | 20 | 70 |
| Polyol D | 80 | 30 |
| Blowing Agent A | 2.0 | 2.15 |
| Crosslinker A | 1.06 | — |
| Surfactant A | 1.25 | — |
| Surfactant C | — | 1.25 |
| Catalyst A | 0.1 | 0.2 |
| Catalyst B | 0.3 | 0.45 |
| Total PBW: | 104.71 | 104.05 |
| Isocyanate A | | 33 |
| Isocyanate D | 25.9 | |
| Isocyanate Index | 100 | 90 |

TABLE 7-continued

Comparison of Allophanate-Modified Polyisocyanate of the
Invention in Flexible Foam Prepared With 30 PHR Polymer Polyol vs.
Toluene Diisocyanate in Flexible Foam Prepared
With 80 PHR Polymer Polyol

| Example | Example 18 (Control) | Example 19 |
|---|---|---|
| Density, pcf | 3.54 | 3.42 |
| ILD 25R, lbs/50 in$^2$ | 85 | 72 |
| ILD 50R, lbs/50 in$^2$ | 155 | 126 |
| Hysteresis | 13.1 | 14.8 |
| Airflow, cfm | 1.15 | 1.7 |
| Ball Rebound, % | 64 | 62 |
| Tear @ 2 in/min, n/m | 231 | 212 |
| Tensile Strength, kPa | 226 | 172 |
| Elongation, % | 102 | 120 |
| "Dry" 50% Compression Set (1) | 8.4 | 9.4 |
| "Humid Aged" 50% Compression Set (2) | 16.8 | 19.6 |
| Honda Wet Set, % CT | 10.5 | 13.8 |

(1) ASTM 3574 Test D
(2) ASTM 3574, Autoclaved under procedure J1, Drying Step 2 Hrs. @ 100° C./in. thickness Examples 18 and 19 demonstrate that by using the allophanate modified polyisocyanates of the present invention that the quantity of polymer polyol can be decreased significantly without adversely affecting the physical properties of the resultant foams. These examples also show the increase in hardness of the foam due to the polymer polyol.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a flexible foam comprising
   (A) reacting
      (1) a liquid, storage stable, allophanate-modified polyisocyanate having an NCO group content of from about 20 to about 42%, and which comprises the reaction product of
         (a) a polyisocyanate, and
         (b) a compound selected from the group consisting of 1,2-propylene glycol and 1,3-butanediol; with
      (2) an isocyanate-reactive component comprising at least one compound which contains isocyanate-reactive groups;
   in the presence of
      (3) a blowing agent; and
      (4) at least one catalyst;
   wherein the reaction is conducted at an isocyanate index of from about 75 to about 115.

2. The process of claim 1, wherein (A)(1) said liquid, storage stable, allophanate-modified polyisocyanate has an NCO group content of from about 23 to about 38%, and comprises the reaction product of:
   (a) an aromatic diisocyanate, and
   (b) a compound selected from the group consisting of 1,2-propylene glycol and 1,3-butanediol.

3. The process of claim 2, wherein (A)(1) has an NCO group content of from about 30 to about 38% by weight, and comprises the reaction product of:
   (a) toluene diisocyanate, and (b) a compound selected from the group consisting of 1,2-propylene glycol and 1,3-butanediol.

4. The process of claim 1, wherein (2) said isocyanate-reactive component comprises at least one compound which contains isocyanate-reactive groups having a molecular weight of from about 1,000 to about 10,000, a functionality of from about 1.5 to about 6.0 and an OH number of from about 11 to about 350.

5. The process of claim 4, wherein (2) said isocyanate-reactive component comprises at least one compound which contains isocyanate-reactive groups having a molecular weight of from about 2,000 to about 6,000, a functionality of from about 1.8 to about 4.0 and an OH number of from about 15 to about 115.

6. The process of claim 1, wherein (3) said blowing agent comprises water.

7. The process of claim 1, wherein said isocyanate index is from about 80 to about 110.

8. A flexible foam comprising the reaction product of:
(1) a liquid, storage stable, allophanate-modified polyisocyanate having an NCO group content of from about 20 to about 42%, and which comprises the reaction product of:
  (a) a polyisocyanate, and
  (b) a compound selected from the group consisting of 1,2-propylene glycol and 1,3-butanediol; with
(2) an isocyanate-reactive component comprising at least one compound which contains isocyanate-reactive groups;
in the presence of
(3) a blowing agent; and
(4) at least one catalyst;
wherein said components are present in quantities such that the isocyanate index is from about 75 to about 115.

9. The flexible foam of claim 8, wherein (A)(1) said liquid, storage stable, allophanate-modified polyisocyanate has an NCO group content of from about 23 to about 38%, and comprises the reaction product of:
(a) an aromatic diisocyanate, and
(b) a compound selected from the group consisting of 1,2-propylene glycol and 1,3-butanediol.

10. The flexible foam of claim 9, wherein (A)(1) has an NCO group content of from about 30 to about 38% by weight, and comprises the reaction product of:
(a) toluene diisocyanate, and
(b) a compound selected from the group consisting 1,2-propylene glycol and 1,3-butanediol.

11. The flexible foam of claim 8, wherein (2) said isocyanate-reactive component comprises at least one compound which contains isocyanate-reactive groups having a molecular weight of from about 1,000 to about 10,000, a functionality of from about 1.5 to about 6.0 and an OH number of from about 11 to about 350.

12. The flexible foam of claim 11, wherein (2) said isocyanate-reactive component coprises at least one compound which contains isocyanate-reactive groups having a m a molecular weight of from about 2,000 to about 6,000, a functionality of from about 1.8 to about 4.0 and an OH number of from about 15 to about 115.

13. The flexible foam of claim 8, wherein (3) said blowing index is from about 80 to about 110.

14. The flexible foam of claim 8, wherein said isocyanate index is from about 80 to about 110.

15. A process for the production of a flexible molded foam comprising:
(A) reacting
  (1) a liquid, storage stable, allophanate-modified polyisocyanate having an NCO group content of from about 20 to about 42%, and which comprises the reaction product of:
    (a) a polyisocyanate, and
    (b) a compound selected from the group consisting of 1,2-propylene glycol and 1,3-butanediol; with
  (2) an isocyanate-reactive component comprising at least one compound which contains isocyanate-reactive groups;
  in the presence of
  (3) a blowing agent: and
  (4) at least one catalyst;
  wherein the reaction is conducted at an isocyanate index of from about 75 to about 115.

16. The process of claim 15, wherein (A)(1) said liquid, storage stable, allophanate-modified polyisocyanate has an NCO group content of from about 23 to about 38%, and comprises the reaction product of:
(a) an aromatic diisocyanate, and
(b) a compound selected from the group consisting of 1,2-propylene glycol and 1,3-butanediol.

17. The process of claim 16, wherein (A)(1) has an NCO group content of from about 30 to about 38% by weight, and comprises the reaction product of:
(a) toluene diisocyanate, and
(b) a compound selected from the group consisting of 1,2-propylene glycol and 1,3-butanediol.

18. The process of claim 15, wherein (2) said isocyanate-reactive component comprises at least one compound which contains isocyanate-reactive groups having a molecular weight of from about 1,000 to about 10,000, a functionality of from about 1.5 to about 6.0 and an OH number of from about 11 to about 350.

19. The process of claim 18, wherein (2) said isocyanate-reactive component comprises at least one compound which contains isocyanate-reactive groups having a molecular weight of from about 2,000 to about 6,000, a functionality of from about 1.8 to about 4.0 and an OH number of from about 15 to about 115.

20. The process of claim 15, wherein (3) said blowing agent comprises water.

21. The process of claim 15, wherein said isocyanate index is from about 80 to about 110.

22. A flexible molded foam comprising the reaction product of:
(1) a liquid, storage stable, allophanate-modified polyisocyanate having an NCO group content of from about 20 to about 42%, and which comprises the reaction product of:
  (a) a polyisocyanate, and
  (b) a compound selected from the group consisting of 1,2-propylene glycol and 1,3-butanediol; with
(2) an isocyanate-reactive component comprising at least one compound which contains isocyanate-reactive groups;
in the presence of
(3) a blowing agent; and
(4) at least one catalyst;
wherein said components are present in quantities such that the isocyanate index is from about 75 to about 115.

23. The flexible molded foam of claim 22, wherien (A)(1) said liquid, storage stable, allophanate-modified polyisocyanate has an NCO group content of from about 23 to about 38%, and comprises the reaction product of:
(a) an aromatic diisocyanate, and
(b) a compound selected from the group consisting of 1,2-propylene glycol and 1,3-butanediol.

24. The flexible molded foam of claim 23, wherein (A)(1) has an NCO group content of from about 30 to about 38% by weight, and comprises the reaction product of:
(a) toluene diisucyanate, and
(b) a compound selected from the group consisting of 1,2-propylene glycol and 1,3-butanediol.

25. The flexible molded foam of claim 22, wherein (2) said isocyanate-reactive component comprises at least one compound which contains isocyanate-reactive groups having a molecular weight of from about 1,000 to about 10,000, a functionality of from about 1.5 to about 6.0 and an OH number of from about 11 to about 115.

26. The flexible molded foam of claim 25, wherein (2) said isocyanate-reactive component comprises at least one compound which contains isocyanate-reactive groups having a molecular weight of from about 2,000 to about 6,000, a functionality of from about 1.8 to about 4.0 and an OH number of from about 15 to about 115.

27. The flexible molded foam of claim 22, wherein (3) said blowing agent comprises water.

28. The flexible molded foam of claim 22, wherein said isoxyanate index is from about 80 to about 110.

* * * * *